A. F. FELLER & P. P. MUSSER.
ROAD WORKING MACHINE.
APPLICATION FILED NOV. 2, 1914.
1,195,344.
Patented Aug. 22, 1916.
5 SHEETS—SHEET 1.
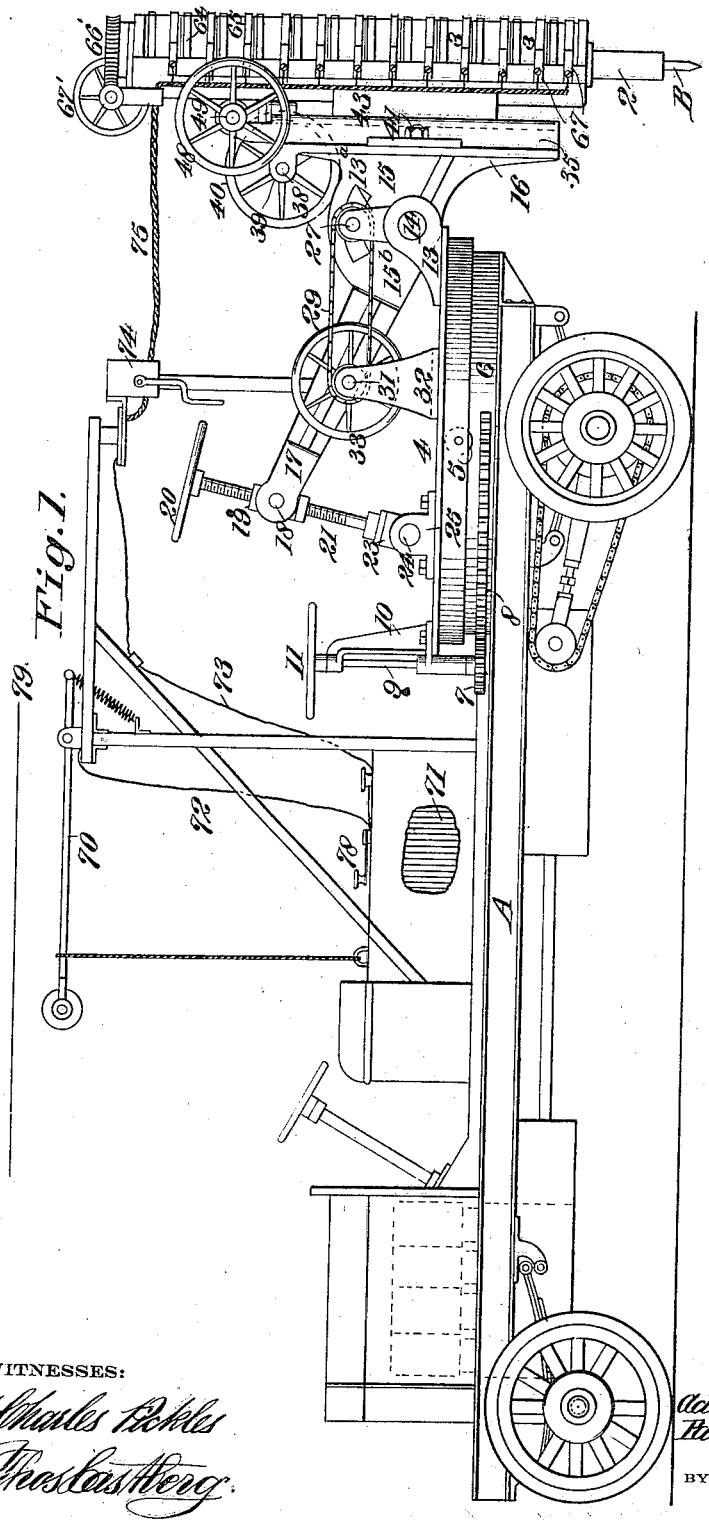
WITNESSES:
Charles Pickles
Thos Eastburg
INVENTORS
Adolph F. Feller
Harley P. Musser.
BY G. H. Strong
ATTORNEY

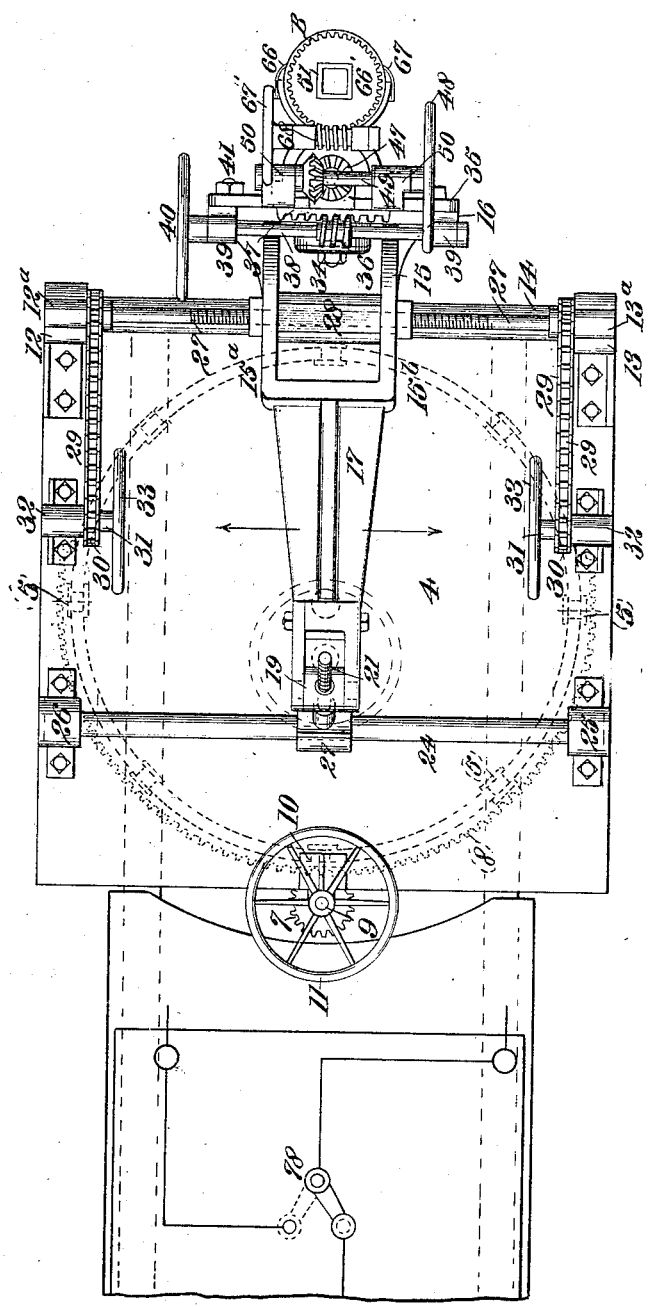

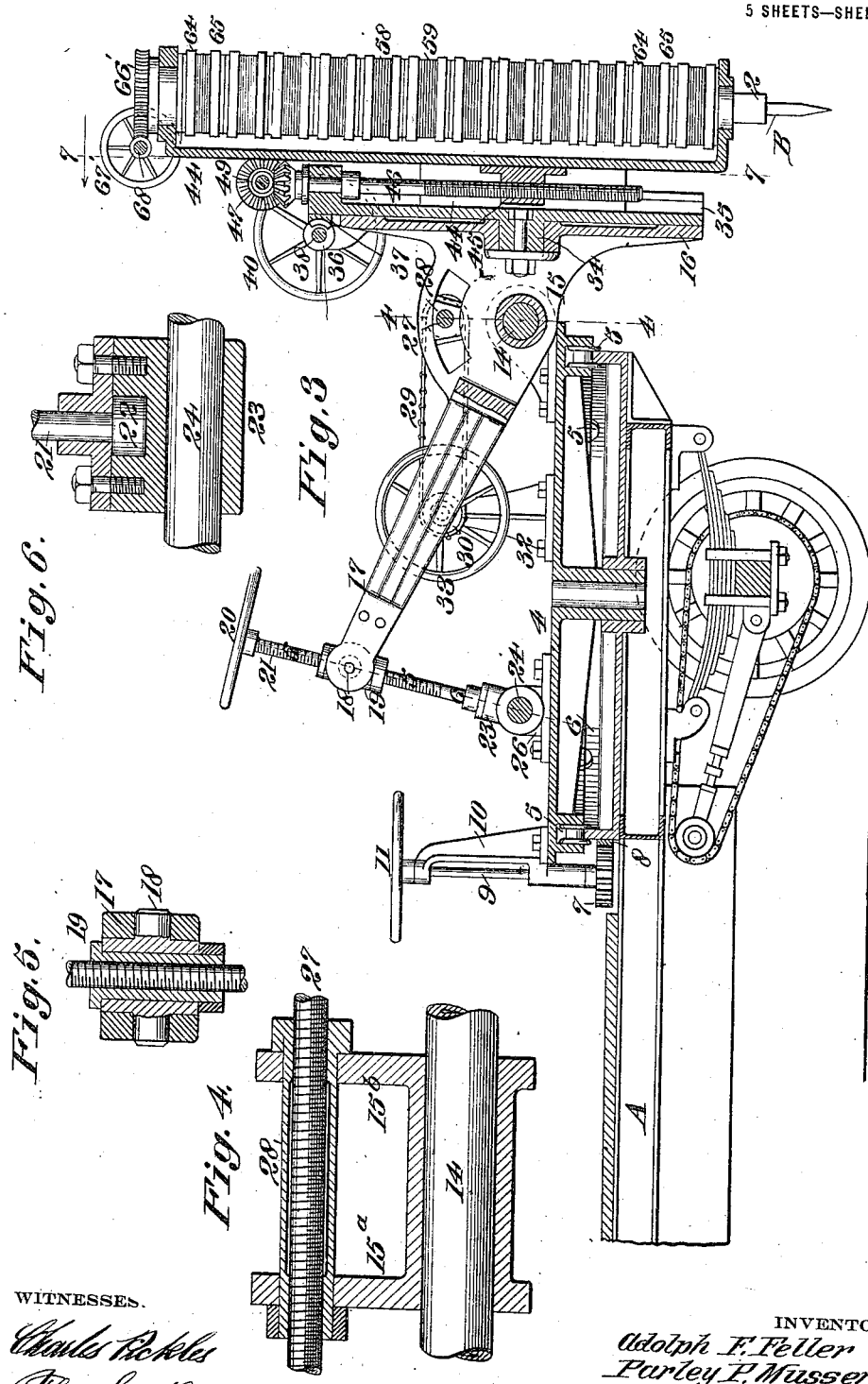

A. F. FELLER & P. P. MUSSER.
ROAD WORKING MACHINE.
APPLICATION FILED NOV. 2, 1914.

1,195,344.

Patented Aug. 22, 1916.
5 SHEETS—SHEET 4.

WITNESSES:
Charles Pickles
Thos Castberg

INVENTORS.
Adolph F. Feller.
Parley P. Musser.
BY G. H. Strong
ATTORNEY

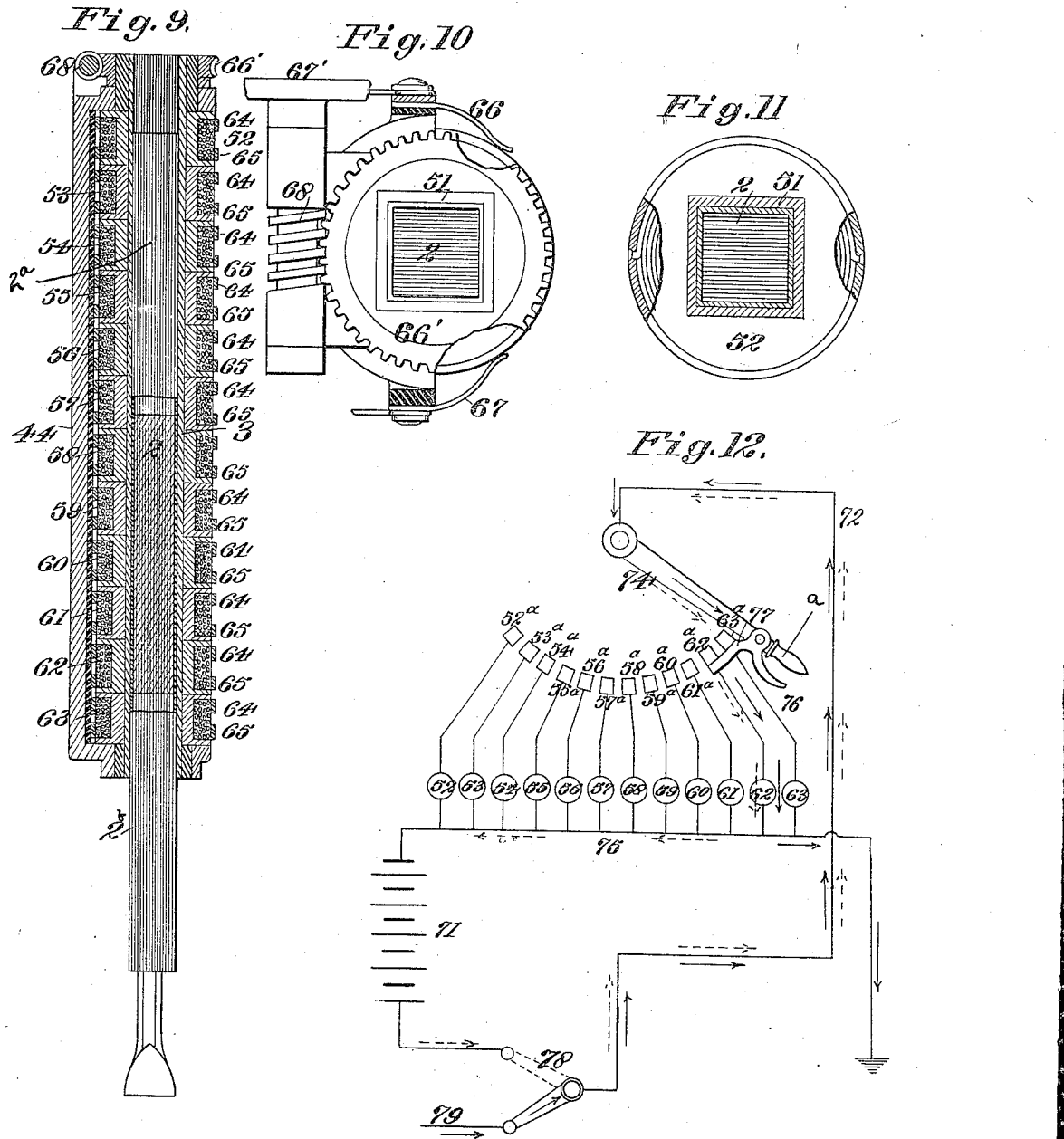

UNITED STATES PATENT OFFICE.

ADOLPH F. FELLER, OF BERKELEY, AND PARLEY P. MUSSER, OF OAKLAND, CALIFORNIA.

ROAD-WORKING MACHINE.

1,195,344.

Specification of Letters Patent.     Patented Aug. 22, 1916.

Application filed November 2, 1914. Serial No. 869,781.

*To all whom it may concern:*

Be it known that we, ADOLPH F. FELLER, of Berkeley, county of Alameda, State of California, and PARLEY P. MUSSER, of Oakland, county of Alameda, State of California, citizens of the United States, have invented new and useful Improvements in Road-Working Machines, of which the following is a specification.

This invention relates to a portable road working machine.

The object of the present invention is to provide a simple, compact, easily operated, portable machine which is particularly designed for breaking up concrete and macadamized roads, cutting asphalt, digging trenches, drilling, ramming or tamping roadbeds, etc., or, in other words, a machine that can be used to great advantage in connection with railroad, street car work, ditching or road making or breaking operations in general.

The invention consists of the parts and the construction and combination of parts as hereinafter more fully described and claimed, having reference to the accompanying drawings, in which—

Figure 7:
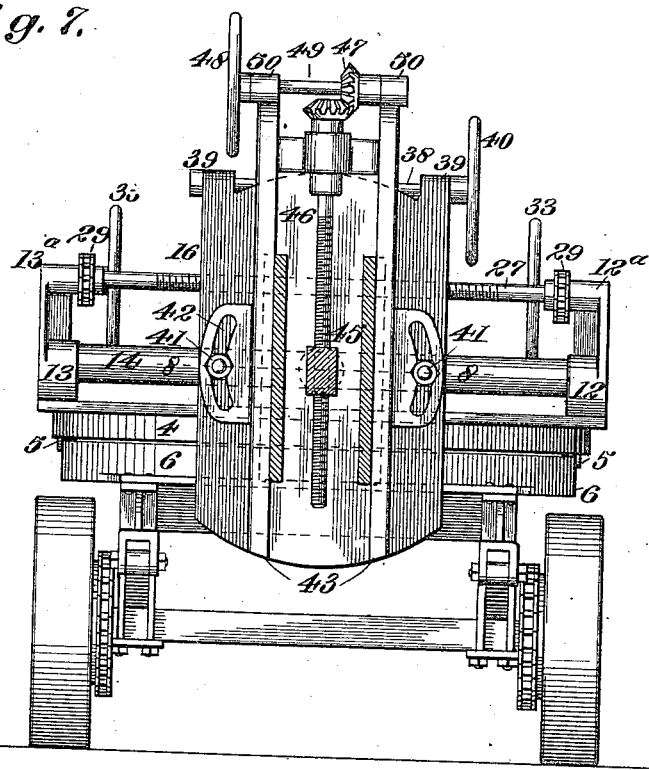
Figure 8:
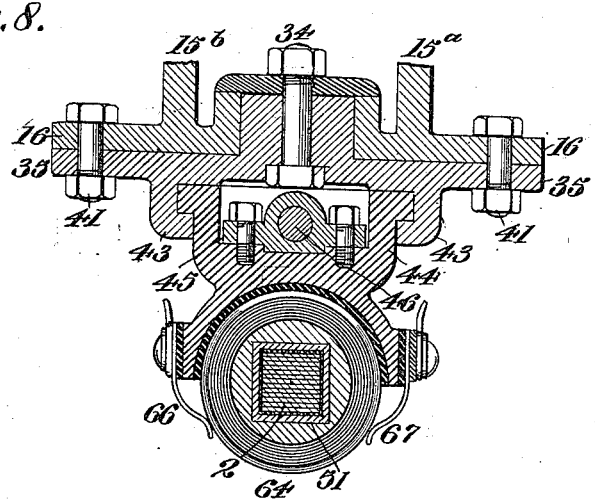

Figure 1 is a side elevation of the machine. Fig. 2 is a partial plan view of same. Fig. 3 is a central vertical section of Fig. 2. Fig. 4 is a central longitudinal section on line 4—4, Fig. 3. Fig. 5 is a vertical central section on line 5—5, Fig. 3. Fig. 6 is a central vertical section on line 6—6, Fig. 3. Fig. 7 is a sectional end view of the machine on line 7—7, Fig. 3. Fig. 8 is a cross section on line 8—8, Fig. 7. Fig. 9 is a vertical central section of the solenoid with connected core and working tool. Fig. 10 is a plan view, partly broken away, of the solenoid magnet. Fig. 11 is a plan view of one of the solenoid magnet spools. Fig. 12 is a diagrammatic view of the electrical connections formed between the source of supply, solenoid magnet and operating switch.

More specifically described, the machine consists of a motor driven truck A, on the rear end of which is mounted an electrically operated impact or cutting tool B. This tool is attached to a square shaped, laminated core member 2 in any suitable manner, and the core is in turn reciprocally mounted in a solenoid magnet 3, hereinafter to be described.

The tool B, with connected adjusting mechanism and operating attachments, is carried and operated by the truck in the following manner: 4 indicates a platform which is rotatively mounted on rollers 5 upon a circular track 6. 7 is a pinion which intermeshes with a semicircular rack 8 secured exterior of the circular track 6. The pinion 7 is secured on the lower end of a shaft 9 which is journaled in a standard 10, secured upon the platform, and movement to turn the pinion, with connected platform, is transmitted through a hand-wheel 11. Journaled in bearings 12 and 13, crosswise of the platform, is a bearing shaft 14, and pivotally mounted on said shaft is a fork-shaped segment 15, on the outer end of which is mounted a face plate 16 and on the inner end of which is secured a lever 17. Pivotally mounted, as at 18, in the outer end of said lever, as indicated in Figs. 1 and 5, is a nut 19, and extending through said nut and operated by a hand-wheel 20 is a screw shaft 21, the lower end of which is turnably secured, as at 22, (see Fig. 6) in a sliding bearing 23 mounted upon a stationary shaft 24 secured in bearings 25 and 26 on the platform. Segment 15, with connected face plate 16 and lever arm 17, is adapted to be moved transversely across the platform by means of a screw shaft 27 which passes through a nut 28, mounted between the forks 15$^a$ and 15$^b$ of the segment, as shown in Fig. 4. The screw shaft 27 is stationary and is mounted in a pair of journal members 12$^a$ and 13$^a$. Power to rotate said shaft, when it is desired to move the face plate from one side of the platform to the other, is transmitted through a pair of chains 29 which pass over sprockets secured on the screw shaft 27 and another pair of sprockets 30 secured upon shafts 31 journaled in standards 32 on each side of the platform. Hand-wheels 33 are provided for turning the connected shafts 31 and 27 and the double arrangement shown is provided for the convenience of the operator; that is, the cross feed or screw shaft 27 may be operated from either side of the platform.

The solenoid magnet proper is secured to the face plate in the following manner: Pivotally mounted, as at 34, on the face plate is a secondary plate 35 which is adapted to be turned laterally about the pivot 34 on the face plate by means of a worm gear 36 which intermeshes with a worm segment 37 secured on the upper end of the secondary plate. The worm gear is secured upon a shaft 38 journaled in bearings 39 fixed on the face plate and it is turned by means of a hand-wheel 40. The secondary plate is turned laterally about the pivot member 34 by means of the worm gearing mechanism just described and is locked in any desired or adjusted position by means of bolts 41 which extend through segmental slots 42 formed in the secondary plate. The bolts 41 are secured to the face plate and will thus clamp and secure the secondary plate in any adjusted position.

Formed on the face of the secondary plate is a pair of dovetailed guides 43, and slidably mounted between said guides is a cross-head 44, in which the solenoid magnet is mounted. Secured on the rear side of the cross-head is a nut 45 and extending through said nut is a screw shaft 46 which is journaled in and carried by the secondary plate. Turning movement is transmitted to the screw shaft 46 by means of a pair of bevel gears 47 and a hand-wheel 48 secured on the shaft 49 which is journaled in extension brackets or arms 50 formed on the secondary plate.

From the foregoing description, it will be seen that the solenoid, with the connected core and impact or cutting tool, may be raised or lowered with relation to the ground or working surface by means of the hand-wheel 48 and screw shaft 26. It can be turned to any lateral angle desired by means of the pivotal mounting of the secondary plate and the adjustment secured by means of the hand-wheel 40 and connected worm gearing, and may, furthermore, be raised or lowered or angularly adjusted, about the bearing shaft 14, by means of the lever arm 17 and screw shaft 21. The working tool as a whole is also capable of transverse adjustment with relation to the supporting platform by means of the screw shaft 27 and may also be swung to any desired point around the rear of the truck by adjusting the position of the platform through means of the pinion 7 and hand-wheel 11.

The solenoid magnet is constructed in the following manner: Referring to Figs. 9, 10 and 11, 51 indicates a metal casing constructed of a non-magnetic material, such as brass, or the like. Suitably secured, outside of said casing, is a plurality of separate windings or spools, as indicated at 52, 53, 54, 55, 56, 57, 58, 59, 60, 61, 62 and 63. These spools are constructed of insulating material and wound in the usual manner. The terminals of each spool are connected with contact rings fixed exterior of the spools, there being two rings, 64 and 65, on each spool. Engaging with each set of rings is a pair of brushes 66 and 67 and these brushes are in turn connected with a source of electric supply, as will hereinafter be described. The provision of the contact rings 64 and 65 permits the solenoid magnet as a whole to be rotated within the crosshead without breaking the circuit through any individual spool, as the brushes will engage with the contact rings and keep the circuit closed at all points. The solenoid magnet, consisting of the casing 51 and the plural spools or windings heretofore described, is turned within the cross-head in the following manner: Secured on the upper end of the casing 51 is a worm wheel 66' and intermeshing with said worm wheel and turned by a hand-wheel 67' is a worm gear 68.

When using a broad bladed cutting tool, such as is shown in Fig. 9, it is desirable to turn the tool to present different angles, especially when cutting or drilling. The rotatable mounting of the solenoid magnet and the provision of means for turning the same permit the turning of the cutting tool without interfering with the circuit connections through the different spools or windings on the solenoid.

In actual practice, referring to Fig. 1, power for the propulsion of the truck as a whole may be secured either by a trolley connection 70 or from a storage battery 71. The same power is directed through the cables 72 and 73 to the several spools on the solenoid magnet and a controlling switch 74 is interposed between the source of supply and the solenoid for the purpose of directing the current through two or more windings on same at a time.

Referring to the diagrammatic view shown in Fig. 12, 52, 53, 54, 55, 56, 57, 58, 59, 60, 61, 62 and 63 represent the separate spools or windings on the solenoid magnet. One terminal of each spool is connected with a separate contact 52ª, 53ª, 54ª, 55ª, 56ª, 57ª, 58ª, 59ª, 60ª, 61ª, 62ª and 63ª respectively, and the opposite terminal of each spool is connected with a common conductor 75 and a source of electric supply, as the battery 71. The controlling switch or lever 74 is connected by a wire 72 with the other side of the battery and the current flow through any two spools or windings on the solenoid magnet will be as follows: Pivotally mounted on the controlling switch and adapted to be operated by a spring-actuated handle 76 is a contact member 77. This is just sufficiently long to engage two of the spool contacts shown, as 63ᵃ and 62ᵃ. It will thus close a circuit through two spools or windings on the solenoid magnet and will consequently lift or attract the laminated core 2 a certain distance. Movement of the controlling lever 74, on the switch, in the direction of arrow $a$ will break the circuit through the spool 63ᵃ and 62ᵃ and will similarly close a circuit through the superimposed spools, gradually advancing from one to the other. The core is thus gradually lifted or attracted and may be released to drop and strike by its own weight by depressing the handle 76, or may be driven down by tractive or electrical force by simply reversing the movement of the switch lever. The stroke of the cutting or impact tool, with connected core 2, may be regulated or controlled by the operator as the swinging movement of the controlling lever 74 adjusts the stroke of the tool. The core proper is preferably constructed of three sections 2, 2ᵃ and 2ᵇ; the central section 2 being the core proper while end sections 2ᵃ and 2ᵇ serve as guide extensions for the core.

Switch 78, shown in the diagrammatic view, is simply provided for the purpose of cutting in the trolley line or battery; the wire 79 representing the trolley line.

Having thus described our invention, what we claim and desire to secure by Letters Patent is—

1. In a road working machine, the combination with a truck having a rotatable platform mounted thereon, of an impact tool supported thereby, means for adjusting said tool vertically, and means for rotating the tool.

2. In a road working machine, the combination with a truck having a rotatable platform mounted thereon, of an impact tool supported thereby, means for adjusting said tool vertically, means for adjusting it laterally, means for adjusting it transversely on the platform, and means for rotating the tool.

3. In a road working machine, the combination with a truck having a rotatable platform mounted thereon, of an impact tool supported thereby, means for adjusting said tool vertically, means for adjusting it laterally, means for adjusting it transversely on the platform, and means for adjusting the tool laterally at right angles to the first-named lateral adjusting means.

4. In a road working machine, the combination with a truck having a rotatable platform mounted thereon, of an impact tool supported thereby, means for adjusting said tool vertically, a cross-head in which the tool is mounted, a face plate, a secondary plate pivotally mounted on the face plate, guide members on the secondary plate in which the cross-head is mounted, and means for raising or lowering said cross-head vertically in said guide members.

5. In a road working machine, the combination with a truck having a rotatable platform mounted thereon, of an impact tool supported thereby, means for adjusting said tool vertically, a cross-head in which the tool is mounted, a face plate, a secondary plate pivotally mounted on the face plate, guide members on the secondary plate in which the cross-head is mounted, means for adjusting the secondary plate laterally with relation to the face plate, and means for adjusting or moving the face plate with connected secondary plate, cross-head and tool transversely of the platform.

6. In a road working machine, the combination with a truck having a rotatable platform mounted thereon, of a bearing shaft secured crosswise on the platform, a face plate slidably and pivotally mounted on said shaft, a cross feed shaft extending through said plate and adapted to move the plate on the bearing shaft transversely on the platform, a secondary plate pivotally mounted on the face plate, a cross-head carried by the secondary plate, and an impact tool mounted on the cross-head.

7. In a road working machine, the combination with a truck having a rotatable platform mounted thereon, of a bearing shaft secured crosswise on the platform, a face plate slidably and pivotally mounted on said shaft, a cross feed shaft extending through said plate and adapted to move the plate on the bearing shaft transversely on the platform, a secondary plate pivotally mounted on the face plate, a cross-head carried by the secondary plate, an impact tool mounted on the cross-head, means for adjusting the cross-head vertically with relation to the secondary plate, and means for adjusting the secondary plate laterally with relation to the face plate.

8. In a road working machine, the combination with a truck having a rotatable platform mounted thereon, of a bearing shaft secured crosswise on the platform, a face plate slidably and pivotally mounted on said shaft, a cross feed shaft extending through said plate and adapted to move the plate on the bearing shaft transversely on the platform, a secondary plate pivotally mounted on the face plate, a cross-head carried by the secondary plate, an impact tool mounted on the cross-head, and means for swinging the face plate with connected secondary plate, cross-head and impact tool about the bearing shaft and securing same in any angularly tilted position thus secured.

9. The combination with a truck or movable support, of a stationary shaft on the support, a carriage pivotally mounted on the shaft, a cross-head vertically adjustable in said carriage, an impact tool mounted on the cross-head, and means for rotating said tool.

10. The combination with a truck or movable support, of a stationary shaft on the support, a carriage pivotally mounted on the shaft, a cross-head vertically adjustable in said carriage, an impact tool mounted on the cross-head, means for rotating said tool, means for tilting the carriage on the shaft to permit the tool to assume an angular position, and means for supporting the carriage in the tilted position.

11. The combination with a truck or movable support, of a stationary shaft on the support, a carriage pivotally mounted on the shaft, a cross-head vertically adjustable in said carriage, an impact tool mounted on the cross-head, means for tilting the carriage on the shaft to permit the tool to assume an angular position, means for supporting the carriage in the tilted position, and means for moving the carriage longitudinally on the shaft.

12. The combination with a truck or movable support, of a stationary shaft on the support, a carriage pivotally mounted on the shaft, a cross-head vertically adjustable in said carriage, an impact tool mounted on the cross-head, means for rotating said tool, means for tilting the carriage on the shaft to permit the tool to assume an angular position, and means for supporting the carriage in the tilted position.

13. The combination with a truck or movable support, of a stationary shaft on the support, a carriage pivotally mounted on the shaft, a cross-head vertically adjustable in said carriage, an impact tool mounted on the cross-head, an arm on the carriage extending rearwardly, means for depressing the arm to tilt the carriage on the shaft, and means for retaining the arm in its depressed position.

14. The combination with a truck or movable support, of a stationary shaft on the support, a carriage pivotally mounted on the shaft, a cross-head vertically adjustable in said carriage, an impact tool mounted on the cross-head, an arm extending outwardly on one side of the carriage, means for depressing the arm to tilt the carriage on the shaft, means for retaining the arm in its depressed position, and means for moving the carriage longitudinally on the shaft.

15. In a road working machine, the combination with a truck having a rotatable platform mounted thereon, of a stationary shaft secured on the platform, a carriage pivotally mounted on the shaft, a plate pivotally mounted on the carriage, means for turning and locking the plate on the carriage, a cross-head vertically adjustable on the plate, and an impact tool carried by the cross-head.

16. In a road working machine, the combination with a truck having a rotatable platform mounted thereon, of a stationary shaft secured on the platform, a carriage pivotally mounted on the shaft, a plate pivotally mounted on the carriage, means for turning and locking the plate on the carriage, a cross-head vertically adjustable on the plate, an impact tool carried by the cross-head, a lever on the carriage, a nut pivotally mounted in the outer end of the lever, a screw rod passing through the nut, and a pivoted sliding member securing the lower end of the rod to the platform.

17. In a road working machine, the combination with a truck having a rotatable platform mounted thereon, of a stationary shaft secured on the platform, a carriage pivotally mounted on the shaft, a plate pivotally mounted on the carriage, means for turning and locking the plate on the carriage, a cross-head vertically adjustable on the plate, an impact tool carried by the cross-head, and a cross-head shaft extending through the carriage and adapted to move the carriage longitudinally on the shaft.

18. In a road working machine, the combination with a truck having a rotatable platform mounted thereon, of a stationary shaft secured on the platform, a carriage pivotally mounted on the shaft, a plate pivotally mounted on the carriage, means for turning and locking the plate on the carriage, a cross-head vertically adjustable on the plate, an impact tool carried by the cross-head, a lever on the carriage, a nut pivotally mounted in the outer end of the lever, a screw rod passing through the nut, a pivoted sliding member securing the lower end of the rod to the platform, and a cross-feed shaft extending through the carriage and adapted to move the carriage longitudinally on the shaft.

19. The combination with a truck or movable support, of a stationary shaft on the support, a carriage pivotally mounted on the shaft, a cross-head vertically adjustable in said carriage, an impact tool mounted on the cross-head, a rearwardly extending arm formed on the carriage, a nut pivotally mounted in the outer end of said arm, a screw extending through the nut, and means for turning the screw to raise or lower the arm to tilt the carriage on the shaft.

20. The combination with a truck or movable support, of a stationary shaft on the support, a carriage pivotally mounted on the shaft, a cross-head vertically adjustable in said carriage, an impact tool mounted on the cross-head, a rearwardly extending arm formed on the carriage, a nut pivotally mounted in the outer end of said arm, a screw extending through the nut, means for turning the screw to raise or lower the arm to tilt the carriage on the shaft, and means for moving the carriage longitudinally on the shaft, a second shaft and a collar connected with the lower end of the screw and slidably mounted on the second shaft to permit the screw to move longitudinally with the carriage.

In testimony whereof we have hereunto set our hands in the presence of two subscribing witnesses.

ADOLPH F. FELLER.
PARLEY P. MUSSER.

Witnesses:
W. W. HEALEY,
M. E. EWING.